United States Patent [19]
Xu

[11] Patent Number: 6,118,912
[45] Date of Patent: Sep. 12, 2000

[54] APPARATUS FOR HOLDING AND TUNING A THIN-FILM OPTICAL ASSEMBLY

[75] Inventor: Jing-Yu Xu, Richardson, Tex.

[73] Assignee: Chorum Technologies, Inc., Richardson, Tex.

[21] Appl. No.: 09/227,064

[22] Filed: Jan. 5, 1999

[51] Int. Cl.$^7$ ...................................................... G02B 6/28
[52] U.S. Cl. .................. 385/24; 385/33; 385/50; 385/52; 385/92; 385/93; 359/124
[58] Field of Search ................................. 385/15, 24, 25, 385/27, 33, 50, 52, 64, 49, 75, 74, 88, 89, 93, 120; 359/124, 622, 634, 891

[56] References Cited

U.S. PATENT DOCUMENTS

| | | | |
|---|---|---|---|
| 5,859,717 | 1/1999 | Scobey et al. | 385/24 X |
| 6,040,944 | 1/1999 | Pan et al. | 385/72 X |

*Primary Examiner*—Phan T. H. Palmer
*Attorney, Agent, or Firm*—John P. Blasko; Douglas J. Ryder; J. P. Blasko Prof. Corp.

[57] ABSTRACT

An apparatus for holding and tuning a thin film optical assembly is presented in which a housing receives a cylindrical thin film optical assembly which can be rotated to adjust the wavelength at which it passes or reflects an optical signal. The thin film optical assembly is composed of a thin film optical filter mounted on a cylindrical unit having a flat mounting face and an aperture for the transmission of light. The housing has a light path machined through it which permits light to pass to each thin film optical assembly, where one wavelength is separated by transmission and the remaining wavelengths are reflected to a subsequent filter. Each thin film optical assembly can be rotated within the housing to permit wavelength tuning. Once the thin film optical assembly is tuned it can be held in place using solder applied between the thin film optical assembly and the housing. Optical fibers are coupled to the housing using ferrules and graded rod index lenses. Each fiber optic assembly can be held in place by solder applied between the ferrule and the housing. The invention can also be used to separate polarizations using optical filters which angular polarization dependence.

16 Claims, 5 Drawing Sheets

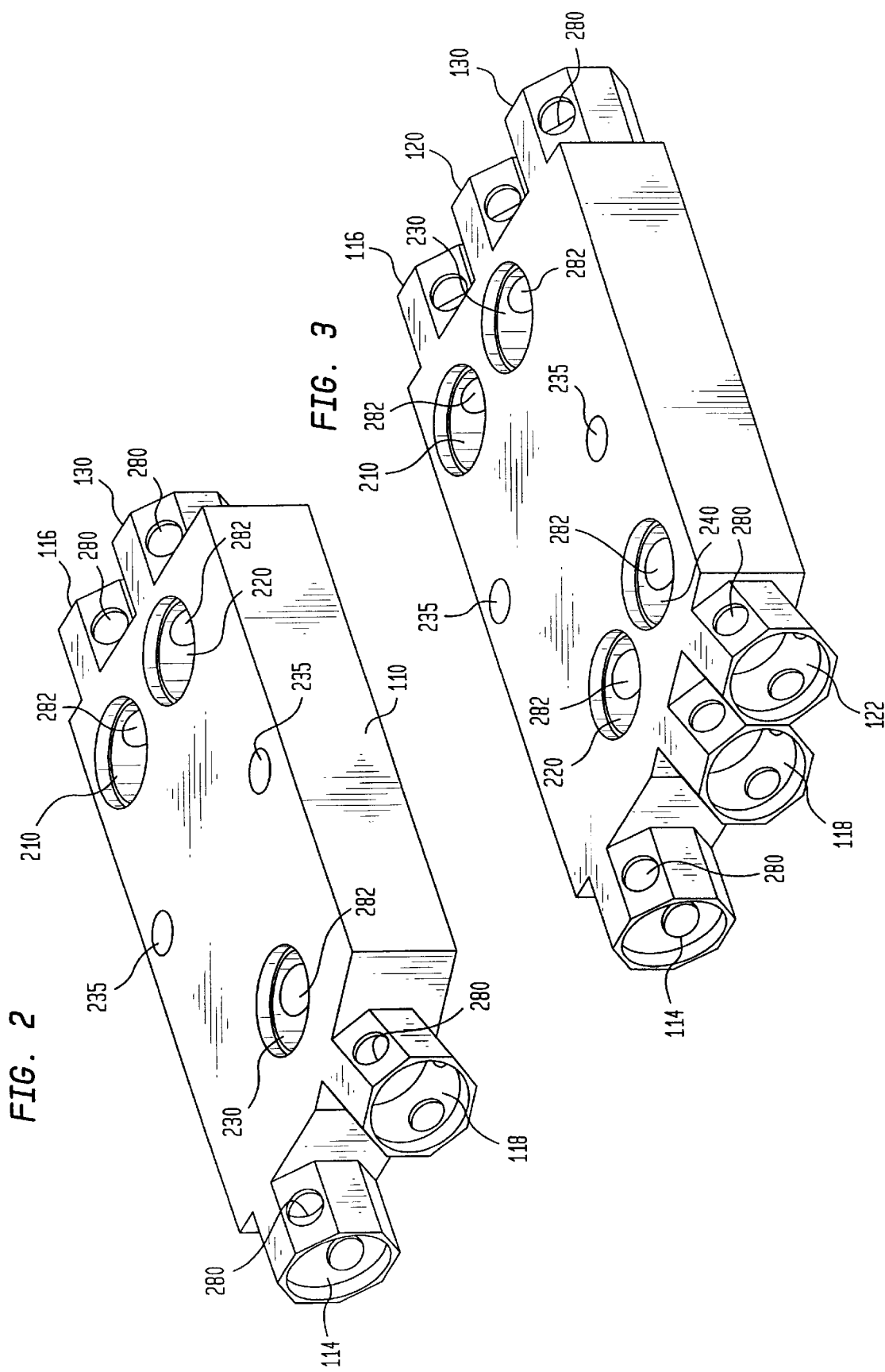

APPARATUS FOR HOLDING AND TUNING A THIN-FILM OPTICAL ASSEMBLY

BACKGROUND OF THE INVENTION

Optical filters are exceptionally useful devices for processing light signals, and have found numerous applications in fiber optic communication systems for separating different wavelengths of light which can carry different communications signals. A number of other applications use optical filters for selectively reflecting or transmitting a light signal, and can thus be employed to re-direct an optical signal within an optical switch, wavelength division multiplexer, or other light processing equipment.

Optical filters are typically constructed from thin films of optical materials with varying indices of refraction, thus forming a multilayer assembly. One characteristic of thin film optical filters is that their transmission (and reflection) characteristics are dependent on the angle at which the light strikes the filter. Because of this angular dependency, a thin film optical filter must be aligned properly in order to provide the desired wavelength or polarization filtering function. Rotating an optical filter about an axis which is perpendicular to the incident light provides a means of tuning the filter and can be used to obtain the desired optical response of the system.

In any optical system where an optical filter is rotated to tune the filter, it is important to have an adequate means for rotating and securing the filter. Motorized stages can be utilized to tune a filter, but are expensive and not suited for small high-volume optical components. Other mechanical rotating stages may be suitable for laboratory work, but as with motorized stages, are not suitable for small high-volume components. Additionally, it is necessary to have the ability to mount and rotate several filters to produce a wavelength division multiplexer with multiple outputs.

For the foregoing reasons, there is a need for an apparatus for holding and tuning a thin film optical assembly.

SUMMARY OF THE INVENTION

The present invention includes an apparatus for holding an aligning a thin-film optical assembly in which the thin-film optical assembly is mounted within a cylindrical holder and inserted in a housing which permits the cylindrical holder to be rotated about an axis which is perpendicular to a light path within the housing. Once properly aligned, the optical assembly can be held in place using a securing means, which in a preferred embodiment is a solder material.

The present invention can be utilized to realize a wavelength division multiplexing device for separating wavelengths of light in which the housing contains a number of optical assemblies, each assembly containing a thin film optical filter and aligned such that light at a selected wavelength passes through a filter and leaves the housing, with the remaining optical signals passing on a light path through the housing and to subsequent optical filter assemblies.

In a preferred embodiment, the present invention is used to realize a wavelength demultiplexer based on the use of a housing formed from a metal slab, with multiple cylindrical optical assembly holders being inserted and adjusted. A slot on the top of each cylindrical optical assembly facilitates adjustments of the optical assembly. In a preferred embodiment, fiber optic assemblies comprised of ferrules and containing graded rod index lenses are inserted into the housing to couple optical signals into and out of the device, and are secured using solder.

In a preferred embodiment the thin film optical assembly is secured to a thin film interference holder using epoxy.

One advantage of the present invention is that it can be utilized to produce wavelength division multiplexers or other optical switching subassemblies in a high-volume environment in which devices are rapidly assembled, tuned and secured with solder. The present invention insures that once tuned the assembly with withstand temperature changes and mechanical shocks without needing repeated adjustments.

Another advantage of the present invention is that the invention can be used to realize a number of optical processing functions since the optical assemblies and the filters contained in those optical assemblies can be designed for wavelength or polarization separation. The present invention can be incorporated as part of an optical processing system such as an optical switch, or can be utilized as a stand-alone optical component in a fiber optic communications system.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 2 is an isometric representation of a 4-port version of the present invention;

FIG. 3 is an isometric representation of a 6-port version of the present invention;

DETAILED DESCRIPTION OF THE PREFERRED EMBODIMENT

Figure 1:
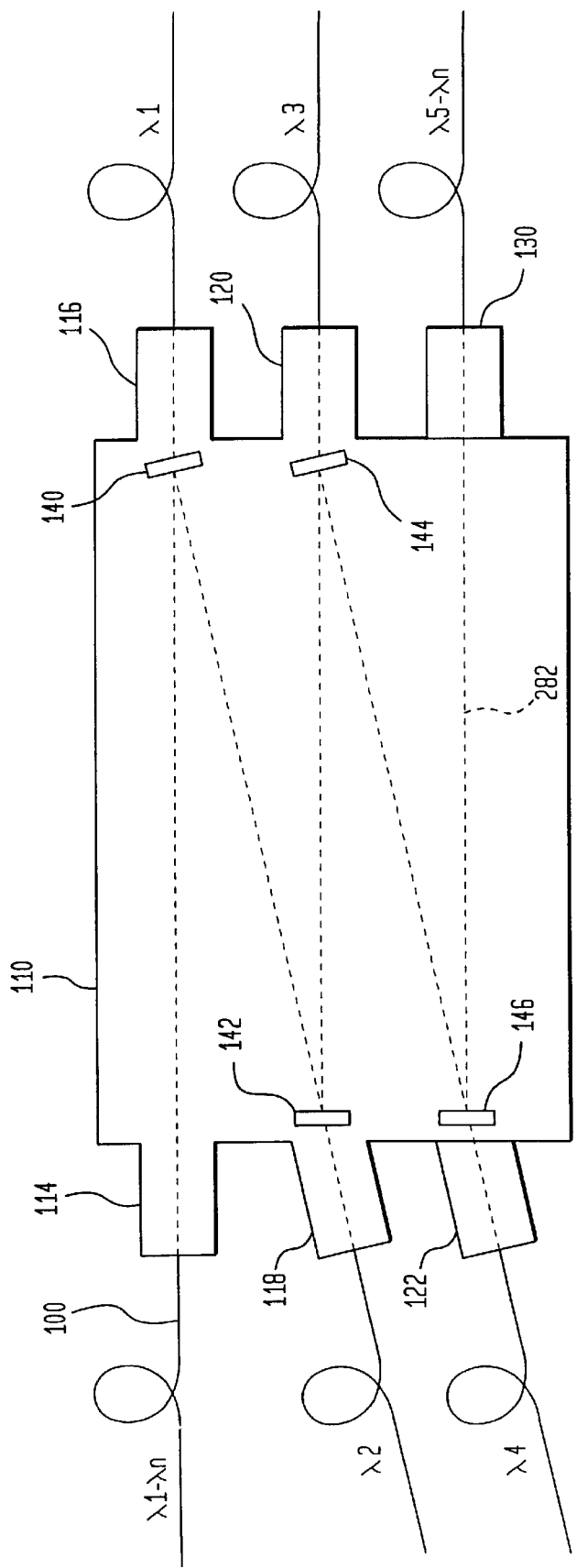
FIG. 1 illustrates a schematic diagram of the present invention when used to separate wavelengths of light.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 12 in particular, the apparatus of the present invention is disclosed.

FIG. 1 shows a schematic diagram of the present invention when used to separate wavelengths of light ($\lambda_1$–$\lambda_4$) in which a housing 110 is used to hold an optical assembly holder which contains a first thin film assembly 140, a second thin film assembly 142, a third thin film assembly 144, and a fourth thin film assembly 146. An optical fiber 100 carries a signal containing multiple wavelengths of light and is received at an input port 114. In a preferred embodiment, optical fiber 100 is coupled to housing 110 using the combination of a metal ferrule and a graded rod index (GRIN) lens.

The optical signal travels through housing 110 and is incident on the first optical thin film assembly 140. In a preferred embodiment optical thin film assemblies 140, 142, 144, and 146 contain thin film interference filters for the separation of different optical wavelengths. Light at wavelength $\lambda_1$ passes through first optical thin film assembly 140 and exits at a first wavelength output port 116.

The remaining optical signals continue on through housing 110 and are incident on second optical thin film assembly 142 which separates out light at wavelength $\lambda_2$ which leaves through a second wavelength output port 118. The remaining wavelengths are incident on third optical filter assembly 144 which separates out light at wavelength $\lambda_3$ which leaves through a third wavelength output port 120. The remaining wavelengths are incident on fourth optical filter assembly 146 which separates out light at wavelength $\lambda_4$ which leaves through a fourth wavelength output port 122. All remaining optical signals, which in this case are comprised of signals $\lambda_5$–$\lambda_n$, are reflected from the fourth optical filter assembly 146 and leave through an exit port 130. A light path 282 shown in FIG. 1 illustrates the path of the optical signal through housing 110.

FIG. 2 illustrates a 4-port embodiment of the present invention, and in addition to illustrating the input port 114, the first wavelength output port 116, the second wavelength output port 118, and the exit port 130, shows other features of the present invention including a first optical assembly holder receptacle 210, a second optical assembly holder receptacle 220, and a third optical assembly holder receptacle 230. Also visible are mounting holes 235, fiber assembly solder holes 280 and light path 282. In a preferred embodiment housing 110 is constructed from machined stainless steel. In an alternate embodiment other metal or synthetic materials (plastics) can be used.

In a preferred embodiment mounting holes 235 are used to mount housing 110 to a substrate or base plate. In a preferred embodiment screws are used for mounting through mounting holes 235.

FIG. 3 illustrates a 6-port embodiment of the present invention which corresponds to the device represented in FIG. 1, and includes a fourth optical assembly holder receptacle 240, third wavelength output port 120, and fourth wavelength output port 122.

Figure 4:
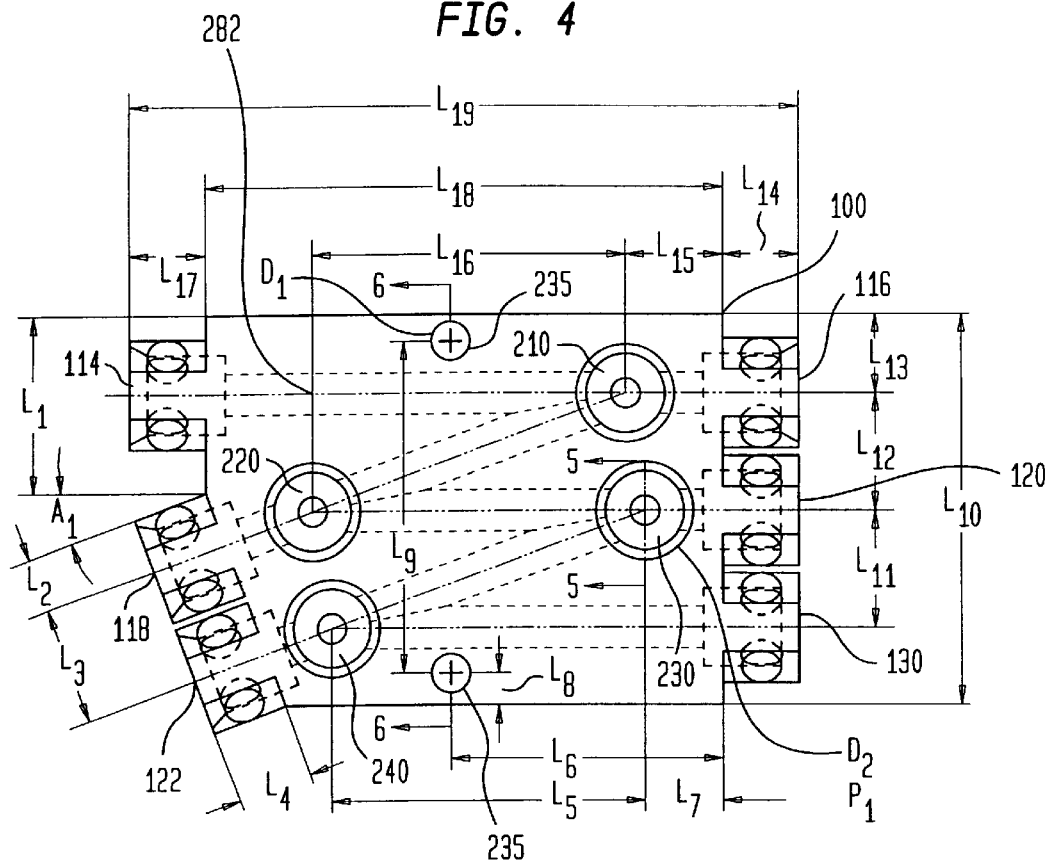
FIG. 4 is a cross-sectional top view of a 6-port version of the present invention.

FIG. 4 is a cross-sectional top view of a 6-port version of the present invention. The lengths (L), diameters (D), depths (P) and angles (A) illustrated in FIG. 4 have the dimensions listed in Table 1 in accordance with one embodiment of the invention. All dimensions, except angles, in Table 1 are given in millimeters.

TABLE 1

| | | |
|---|---|---|
| L1 = 9.0 | L9 = 17.0 | L17 = 4.0 |
| L2 = 2.8 | L10 = 20.0 | L18 = 27.0 |
| L3 = 6.0 | L11 = 6.0 | L19 = 35.0 |
| L4 = 4.0 | L12 = 6.0 | D1 = 2.5 |
| L5 = 16.5 | L13 = 4.0 | D2 = 4.0 |
| L6 = 13.5 | L14 = 4.0 | P1 = 5.1 |
| L7 = 4.0 | L15 = 5.0 | A1 = 20° |
| L8 = 1.5 | L16 = 16.5 | |

Figure 5:
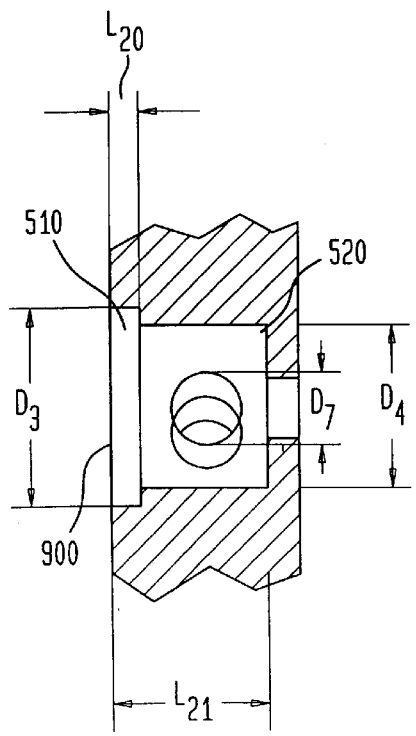
FIG. 5 is a cross-sectional longitudinal view of a cylindrical optical assembly holder inserted into the housing.
Figure 6:
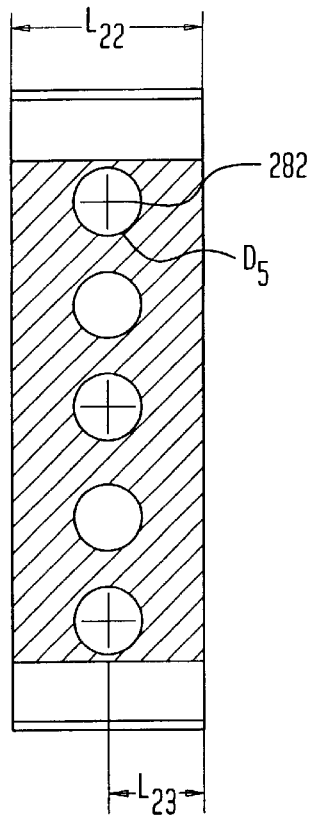
FIG. 6 is a cross-sectional longitudinal view of the housing.

Locations for the cross-sectional views illustrated in FIGS. 5 and 6 are also shown in FIG. 4.

FIG. 5 is a cross-sectional longitudinal view of a cylindrical optical assembly holder inserted into the housing 110, illustrating the presence of a lip 510 which limits the depth of insertion of optical assembly holder 900 into cylindrical receptacle 520.

FIG. 6 is a cross-sectional longitudinal view of the housing and illustrates light path 282.

Figure 7:
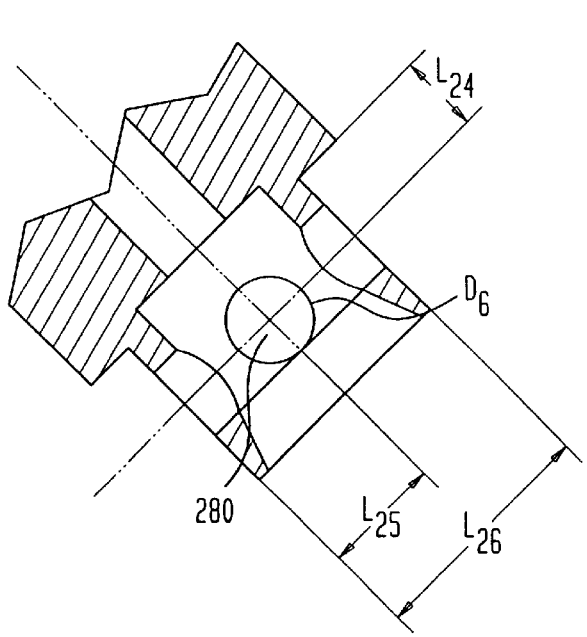
FIG. 7 is a cross-sectional longitudinal view of a fiber optic assembly receptacle.
Figure 8:
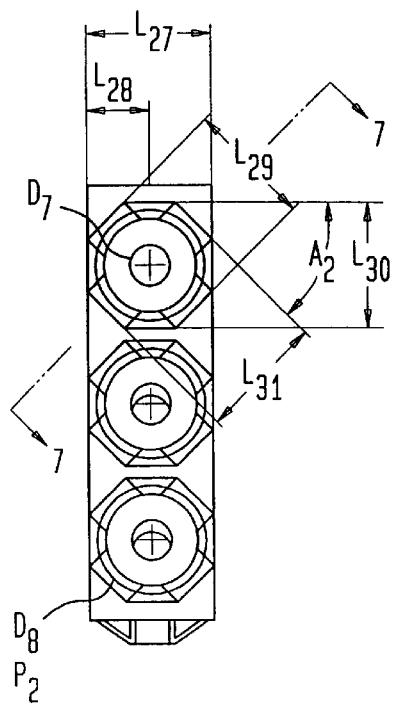
FIG. 8 is an end-view of the housing.

FIG. 7 is a cross-sectional longitudinal view of a fiber optic assembly receptacle which corresponds to input port 114, first through fourth wavelength output ports 116, 118, 120, and 122 respectively, and exit port 130. Fiber assembly solder hole 280 is visible and in a preferred embodiment is used to allow solder to form a metallic bond between housing 110 and a fiber optic assembly including a metallic ferrule. The position of the cross-sectional view illustrated in FIG. 7 is shown in FIG. 8.

The lengths (L) and diameters (D) illustrated in FIGS. 5, 6 and 7 have the dimensions listed in Table 2 in accordance with one embodiment of the invention. All dimensions in Table 2 are given in millimeters.

TABLE 2

| | | |
|---|---|---|
| L20 = 1.0 | L24 = 2.0 | D4 = 4.0 |
| L21 = 5.1 | L25 = 2.8 | D5 = 2.0 |
| L22 = 5.6 | L26 = 5.6 | D6 = 2.0 |
| L23 = 2.8 | D3 = 5.0 | D7 = 1.5 |

FIG. 8 is an end-view of the housing, illustrating light path 282 and first and third wavelength output ports 116 and 120 respectively, along with exit port 130. The lengths (L), diameters (D), depths (P) and angles (A) illustrated in FIG. 8 have the dimensions listed in Table 3 in accordance with one embodiment of the invention. All dimensions, except angles, in Table 3 are given in millimeters.

TABLE 3

| | | |
|---|---|---|
| L27 = 5.6 | L30 = 5.6 | D8 = 4.0 |
| L28 = 2.8 | L31 = 5.6 | P2 = 6.0 |
| L29 = 5.6 | D7 = 2.0 | A2 = 45° |

Figure 9:
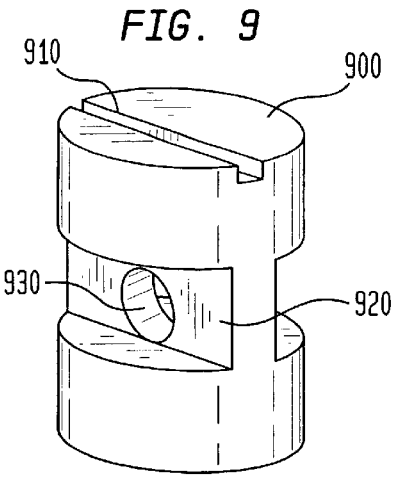
FIG. 9 is an isometric view of the cylindrical optical assembly holder.
Figure 10:
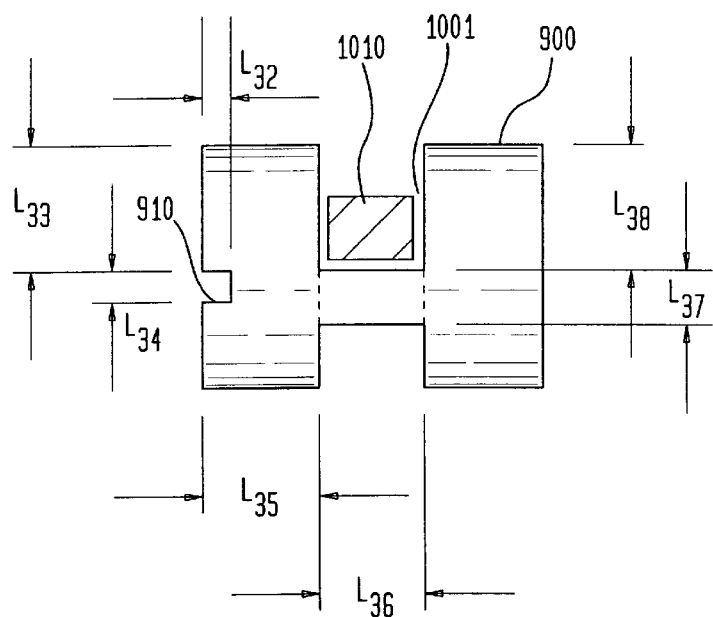
FIG. 10 is a cross-sectional view of the cylindrical optical assembly holder perpendicular to the direction of light propagation.

FIG. 9 illustrates an optical assembly holder 900 which has an optical assembly adjustment slot 910, and optical assembly mounting area 920, and an optical assembly holder aperture 930. In a preferred embodiment optical assembly mounting area is flat and allows mounting of thin film assembly 1010 using epoxy or other adhesive. FIG. 10 illustrates a cross-sectional view of the optical assembly holder 900 perpendicular to the direction of light propagation. As shown in FIG. 10 a thin film assembly 1010 is mounted in optical assembly holder 900 using epoxy 1001.

The lengths (L) illustrated in FIG. 10 have the dimensions listed in Table 4 in accordance with one embodiment of the invention. All dimensions in Table 4 are given in millimeters.

TABLE 4

| L32 = 0.5 | L35 = 2.0 | L38 = 2.0 |
|---|---|---|
| L33 = 2.0 | L36 = 1.6 | |
| L34 = 0.5 | L37 = 1.0 | |

Figure 11:
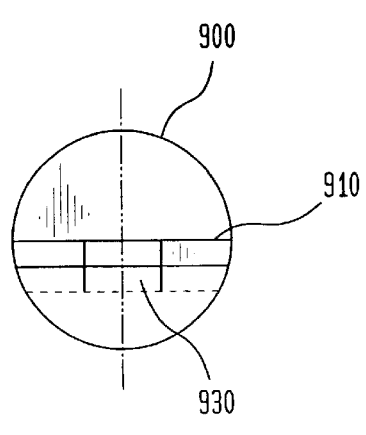
FIG. 11 is a cross-sectional top view of the cylindrical optical assembly holder.
Figure 12:
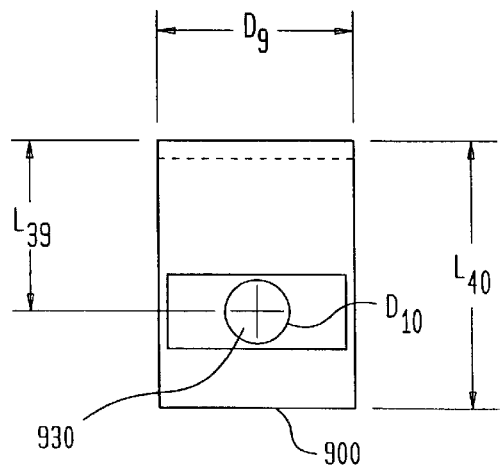
FIG. 12 is a cross-sectional side view of the cylindrical optical assembly holder parallel to the direction of light propagation.

FIG. 11 is a cross-sectional top view of the cylindrical optical assembly holder, and FIG. 12 is a cross-sectional side view of the cylindrical optical assembly holder parallel to the direction of light propagation. The lengths (L) and diameters (D) illustrated in FIG. 12 have the dimensions listed in Table 5 in accordance with one embodiment of the invention. All dimensions in Table 5 are given in millimeters.

TABLE 5

| L39 = 2.8 | D9 = 4.0 |
|---|---|
| L40 = 5.1 | D10 = 1.5 |

In a preferred embodiment, thin film assembly 1010 is a multilayer interference filter which selectively passes a wavelength which is one of the International Telecommunications Union (ITU) standard fiber-optic telecommunication channel frequency and wavelengths. These wavelengths are part of a standard grid which in a preferred embodiment covers the wavelength range of 1562.233 nm (191,900 GHz) to 1530.725 nm (195,850 GHz) with a spacing of 50 GHz between wavelengths (frequencies). The multilayer interference filter is constructed such that it passes a wavelength on this grid, having a center wavelength at one of the standard wavelengths, a center wavelength tolerance of ±0.2 nm, a minimum −0.5 dB passband width of 0.9 nm, a maximum −25 dB passband width of 4.0 nm, a maximum insertion loss of 0.3 dB at the center wavelength, a maximum passband ripple of 0.3 dB, a maximum polarization dependent loss of 0.05 dB, and a maximum thermal wavelength drift of 0.003 nm/°C. The incident angle and polarization is 10° for both transverse electric and transverse magnetic polarizations.

In a preferred embodiment the multilayer interference filter is constructed from layers of alternating high and low index materials deposited on a 1.4 mm by 1.4 mm BK-7 glass substrate, with the resulting device having a thickness of approximately 1 mm. The construction of multilayer interference filters is well known to those skilled in the art and such filters are readily available or can be constructed based on the above specification. In a preferred embodiment the above specification is met over an operating temperature range of −40° C. to 85° C.

In an alternate embodiment a multilayer interference filter designed to separate polarizations is used, in which case one polarization passes through the filter while another is reflected and travels through housing 110 on light path 282.

In a preferred embodiment epoxy 1001 is used to attach thin film assembly 1010 to optical assembly holder 900. A suitable epoxy is the EP65HT-1 epoxy sold by Master Bond Inc. Suitable alternative bonding materials are known to those skilled in the art and may include cements, pastes and other adhesive materials. In an alternate embodiment, a mechanical mounting system is used to attach thin film assembly 1010 to optical assembly holder 900.

As an example of the industrial applicability of the present invention a housing 110 is constructed from machined stainless steel which is plated with nickel and gold, and having the characteristics, features and dimensions illustrated in FIGS. 1–12. Thin film optical filters in the form of interference filters are mounted on multiple optical assembly holders 900 and inserted into housing 110. Optical fibers having gold plated ferrules and graded rod index lenses are inserted into the appropriate ports and secured using solder at fiber assembly solder holes 280. The gold plated ferrule unit acts as a collimator which is formed by mounting the optical fiber in a glass capillary with GRIN lens. An incident optical signal is coupled to input port 114 and light exiting through first through fourth wavelength output ports 116, 118, 120, 122 on optical fibers are monitored in sequence for tuning based on rotation of optical assembly holder using a screwdriver blade inserted into optical assembly adjustment slot 910.

Once each optical assembly holder has been adjusted by rotation about an axis perpendicular to light path 282 each optical assembly holder 900 is secured to housing 110 using solder. The resulting wavelength division multiplexor can be used to separate wavelengths in an optical communications system or other optical processing device.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. An apparatus for holding and aligning a thin-film optical assembly, said apparatus comprising:

a) an optical assembly holder wherein said optical assembly holder contains said thin-film optical assembly;

b) a housing for containing said optical assembly holder wherein said housing has a light path for the propagation of light through said housing and wherein said housing supports the insertion of said optical assembly holder, and wherein said optical assembly holder can be rotated about an axis which is perpendicular to said light path and which intersects said light path, and wherein rotation of said optical assembly holder permits the rotational adjustment of said optical assembly to optimize transmission of light at a predetermined wavelength.

2. The apparatus described in claim 1 further characterized in that said optical assembly is held in a fixed position using securing means subsequent to rotational adjustment to prevent rotation.

3. The apparatus described in claim 2 further characterized in that said securing means is a solder material.

4. A wavelength demultiplexer for separating wavelengths of light comprising:

a) multiple optical assembly holders wherein each of said optical assembly holders contains a thin-film optical assembly which transmits light at a selected wavelength;

b) a housing for containing said multiple optical assembly holders wherein said housing contains a light path for the propagation of light through said housing and wherein said light path has multiple light path segments including a first light path segment which is formed between an input port and a first filter holder, a second reflected light path segment formed between said first filter holder and a second filter holder, wherein said first light path segment is at a non-zero angle from said second reflected light path segment and wherein said housing permits rotational adjustment of each of said multiple optical assembly holders to optimize transmission of light at a predetermined wavelength.

5. The apparatus described in claim 4 further characterized in that said optical assembly is held in a fixed position using securing means subsequent to rotational adjustment to prevent rotation using securing means.

6. The apparatus described in claim 5 further characterized in that said securing means is a solder material.

7. A wavelength demultiplexer for separating wavelengths of light comprising:
   a) multiple cylindrical optical assembly holders wherein each of said optical assembly holders contains a flat mounting portion upon which a thin-film optical assembly which transmits light at a selected wavelength can be mounted;
   b) a housing for containing said multiple cylindrical optical assembly holders wherein said housing is formed from a slab of metallic material wherein said slab defines a plane, has a set of a first type of cylindrical openings perpendicular to said plane for the insertion of said optical assembly holders, a set of a second type of cylindrical openings parallel to said plane for the insertion of a set of fiber optic assemblies, and wherein said slab contains a light path for the propagation of light through said slab wherein said light path has multiple light path segments including a first light path segment which is formed between an input port and a first optical assembly holder and a second reflected light path segment formed between said first optical assembly holder and a second optical assembly holder wherein said first light path segment is at a non-zero angle from said second reflected light path segment and wherein said housing permits rotation of each of said multiple optical assembly holders to optimize transmission from said input port to an output port at said selected wavelength with said output ports being identified with said optical assembly holders.

8. The apparatus described in claim 7 further characterized in that said optical assembly holder has a slotted portion to assist in rotation of said interference holder about an axis which is perpendicular to said plane and wherein said rotation can be accomplished using a blade device.

9. The apparatus described in claim 7 further characterized in that said second type of cylindrical openings have a third type of opening which permits the application of a securing means to secure said fiber optic assemblies.

10. The apparatus described in claim 9 further characterized in that said fiber optic assemblies comprise a ferrule and a graded rod index (GRIN) lens.

11. A apparatus for monitoring a portion of an optical signal, said apparatus comprising:
   a) a cylindrical optical assembly holder wherein of said cylindrical optical assembly holder contains a flat mounting portion upon which a thin-film optical assembly which reflects a portion of an incident optical signal is mounted;
   b) a housing for containing said cylindrical optical assembly holder wherein said housing is formed from a slab of metallic material wherein said slab defines a plane, has a first type of cylindrical opening with an axis that is perpendicular to said plane for the insertion of said cylindrical optical assembly holder, a set of a second type of cylindrical openings for the insertion of fiber optic assemblies wherein said second type of cylindrical openings have axes that are parallel to said plane, and wherein said slab contains a light path for the propagation of light wherein said light path has multiple light path segments including a first light path segment which is formed between an input port and said cylindrical optical assembly holder and a second reflected light path segment formed between said cylindrical optical assembly holder and an output port and wherein said housing permits rotation of said cylindrical optical assembly holder to obtain a pre-determined signal level in said reflected light path segment.

12. The apparatus described in claim 11 further characterized in that said cylindrical optical assembly holder has a slotted portion to assist in rotation of said cylindrical optical assembly holder about an axis which is perpendicular to said plane and wherein said rotation can be accomplished using a blade device.

13. The apparatus described in claim 11 further characterized in that said second type of cylindrical openings have a third type of opening which permits the application of a securing means to secure said fiber optic assemblies.

14. The apparatus described in claim 13 further characterized in that said fiber optic assemblies comprise a ferrule and a graded rod index (GRIN) lens.

15. The apparatus described in claim 13 further characterized in that said securing means is a solder material.

16. The apparatus described in claim 11 further characterized in that said thin-film optical assembly is secured to said thin-film interference holder using epoxy.

* * * * *